United States Patent [19]

Schletter

[11] 4,231,324
[45] Nov. 4, 1980

[54] MILK QUANTITY METER

[75] Inventor: Peter Schletter, Kirchhellen-Bottrop, Fed. Rep. of Germany

[73] Assignee: DEC GmbH, Fed. Rep. of Germany

[21] Appl. No.: 17,234

[22] Filed: Mar. 5, 1979

[30] Foreign Application Priority Data

Mar. 10, 1978 [DE] Fed. Rep. of Germany ....... 2810376

[51] Int. Cl.³ .......................... A01J 7/00; G01F 15/08
[52] U.S. Cl. .................................. 119/14.17; 73/313; 119/14.46
[58] Field of Search ............... 119/14.17, 14.15, 14.05, 119/14.06, 14.08, 14.46; 73/313, DIG. 5

[56] References Cited

U.S. PATENT DOCUMENTS

| | | | |
|---|---|---|---|
| 2,886,000 | 5/1959 | Clegg | 119/14.17 X |
| 3,044,443 | 7/1962 | Baum | 119/14.06 |
| 3,678,750 | 7/1972 | DiNoia et al. | 73/313 |
| 3,919,975 | 11/1975 | Duncan | 119/14.05 |

Primary Examiner—Hugh R. Chamblee
Attorney, Agent, or Firm—McGlew and Tuttle

[57] ABSTRACT

A milk quantity meter of the type used in milking stations for directly measuring a quantity of milk yielded by a cow during a milking having a separating chamber for separating milk from a mixture of milk and air; the separating chamber is followed by a milk measuring receptacle which includes means partly disposed within the receptacle for indicating the quantity of milk in response to the level of milk and a shutoff device for alternately closing a milk inlet and outlet associated with the receptacle.

4 Claims, 2 Drawing Figures

MILK QUANTITY METER

FIELD AND BACKGROUND OF THE INVENTION

The invention relates, in general, to a milk quantity meter for milking stations, to directly measure the milk quantity yielded by a cow during a milking, and, more particularly, to a milk quantity meter having a low-pressure separation chamber for separating the milk from any air or other gases entrained in newly produced milk.

A known as a device for checking the quantity of milk obtained with a milking machine, is equipped for continuously branching off samples, and includes a detachable receptacle receiving the samples. More particularly, a position-independent quantity meter is provided, for example, a vane wheel with a counter, having a cross bore in its outer connection, for branching off the sample, the counter and the sampling receptacle being settable and detachable, respectively. Milk containing air flows through a connecting hose directly to the quantity meter. Since no separation of the air portion is provided upstream of the quantity meter, in practice, an accurate measurement of the milk quantity is not obtainable. (see German Pat. No. 929,398).

A further known milking apparatus including a milk quantity meter has on the bottom of a milk container, an outlet which is closed by a valve controllable by the milk volume present in the container. A milk proportioning device for the milk quantity meter and a vacuum discharge system for removing the milk with the valve open are connected to the outlet. As soon as a volume of milk sufficient to open the valve is supplied into the milk container, the preponderant quantity of milk is drained through a main milk line into a main milk collecting vessel. A much smaller, but proportional, volume of the milk is directed through a milk measuring line into the milk container having a measuring scale. With the milking operation terminated, a shut-off member is opened, so that atmospheric air penetrates into the milk measuring line to clean it. The quantity of milk drawn during each milking period can be read on the scale of the milk measuring container. As evident, this prior art milking apparatus or milk quantity meter operates with a milk proportioning device and again is not capable of separating the air proportion from the obtained mixture of milk and entrained air. Consequently, the measuring of the milk quantity remains inaccurate (see Austrian Pat. No. 292,363).

SUMMARY OF THE INVENTION

The invention is directed to a milk quantity meter of the kind described above, which is suitable for accurately measuring the milk quantity yielded by a cow, directly during the milking operation, and is particularly easy to clean, and in addition, is simple in design and reliable in service.

This objective is obtained, in accordance with the invention, by providing that a container including a separation chamber separating the milk and entrained air is connected a milk measuring receptacle for the separated milk, in which an electrical milk measuring device for the milk quantity or level present in the receptacle is provided. An electrically operating counter is connected to the milk measuring device. The invention starts from the experience that the milk quantity separated from air can be measured with particular accuracy electrically. An electrical milk measuring device can easily be inserted into the milk measuring container as a self-contained constructional part, so that, in particular, no problems arise with the cleaning. Moreover, an electrical milk measuring device insures a particularly accurate measurement of the milk quantity or level present in the milk measuring container.

In accordance with a preferred embodiment of the invention, the milk measuring receptacle is designed as a milk measuring cylinder that is vertical disposed below the separation chamber. At its upper end, a milk inlet opening connects to the separation chamber. At its lower end and concentrically of the milk inlet, a milk outlet opening, is provided. Both openings may be alternately closed or opened by means of a common shutoff device. By alternately closing and opening, it is understood that the lower outlet opening is closed as long as the upper opening is opened, and the upper opening is closed as long as the lower opening is open. The shutoff device have a vertical actuating rod extending through the milk measuring receptacle, or through both the measuring receptacle the separation chamber. The shutoff device, which is actuated directly or indirectly in response to the milk level in the receptacle, carries closing members of which one clears the milk inlet opening while the other closes the milk outlet opening, and conversely. Advantageously, the openings have circular cross sections while the closing members are designed as conical or spherical shaped bodies.

According to another inventive provision of distinct importance, the milk measuring device comprises a measuring tube extending in the milk measuring receptacle co-axially with the axis thereof and equipped with sensing means such as magnet switches or contacts, for example, reed-type contacts, disposed at different spaced-apart level locations indicating the contents. A magnetic float, which is slidably guided on the measuring tube, actuates the magnetic switches or contacts which are electrically connected to the counter. The float, which preferably is designed as a permanent magnet, ascends along the measuring tube with the rising milk level in the milk measuring receptacle and actuates the magnet switches or contacts arranged in the manner of graduation marks, in accordance with the actual level of the milk surface. Individual signals are delivered to the electrically operating counter. Each signal corresponding to the respective milk surface level is converted by the counter into a milk volume indication forming the output of the counter. The magnet switches or contacts arranged at axially spaced intervals in the measuring tube thus represent a graduated counting chain proportional to the respective volumes in a cylindrical receptacle. Even with the milk measuring receptacle not completely filled, the respective milk level may be determined without delay. In an alternate embodiment of the invention, the milk sensing means comprises measuring electrodes which are disposed one above the other at predetermined distances indicating the contents, and are electrically connected to the counter. In this design, the individual signals are produced and delivered to the counter as soon as the milk level reaches the respective measuring electrode.

An externally disposed, detachable sampling container may be provided between the separation chamber and the milk measuring receptacle. The sampling container communicates, through corresponding fluid lines, with the separation chamber and the milk measuring receptacle. A support may be provided to the separation chamber, to which the sampling container may suitably be secured by means of a slide catch or the like.

A principle advantage obtained with the invention is that the inventive milk quantity meter for milking stations insures an accurate measurement of the milk amount yielded by a cow during the entire drawing operation. In addition, the cleaning of the inventive milk quantity meter is particularly easy. A further distinguishing feature is that the construction of the inventive milk is simple and reliable in operation and can easily be installed at a milking station or a weanling stable.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

In the following, the invention will be explained in more detail with reference to the drawings showing a simple embodiment and in which:

DESCRIPTION OF THE PREFERRED EMBODIMENTS

Figure 1:
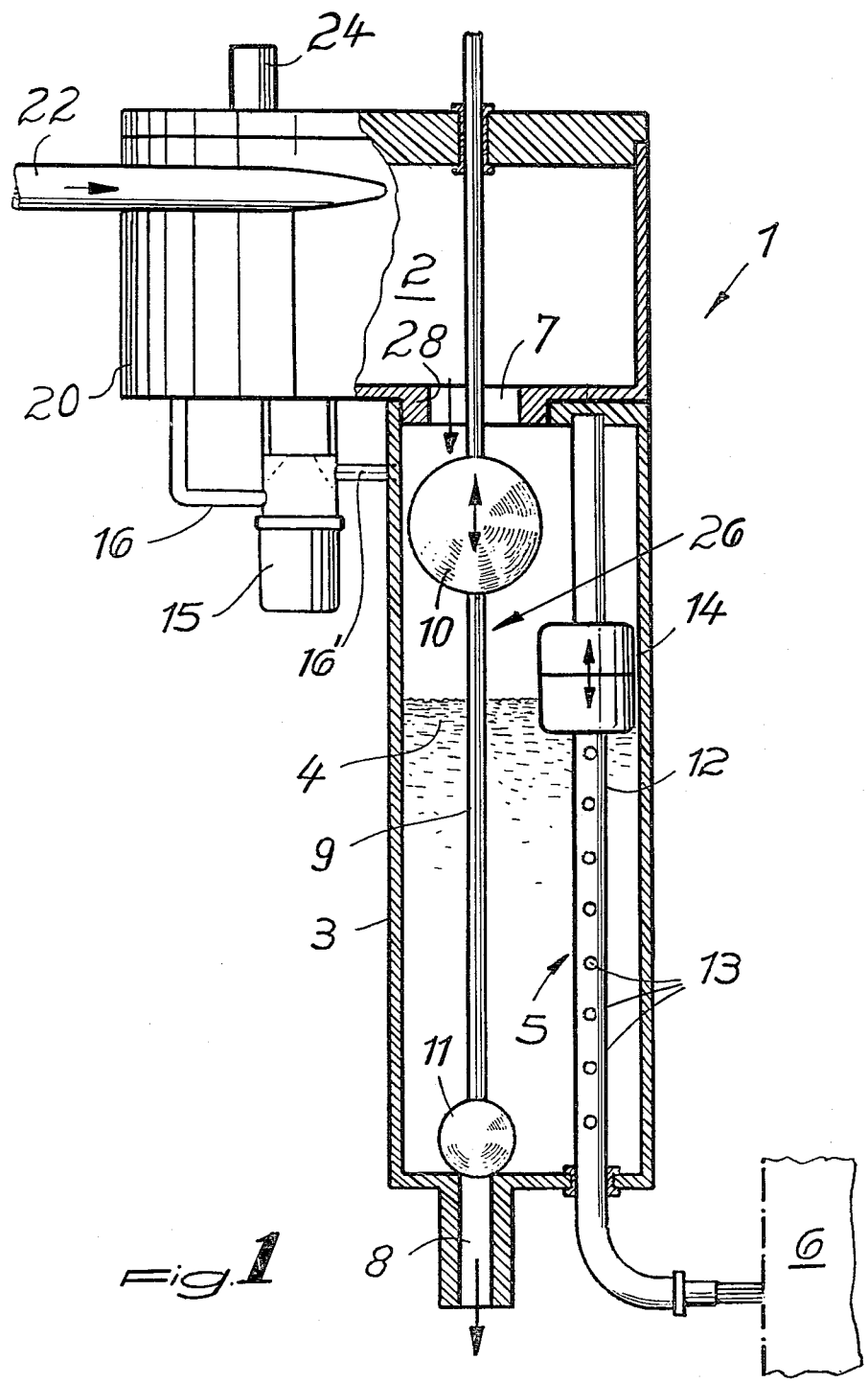
FIG. 1 is a diagramatical vertical sectional view of a milk quantity measuring device constructed in accordance with the invention.
Figure 2:
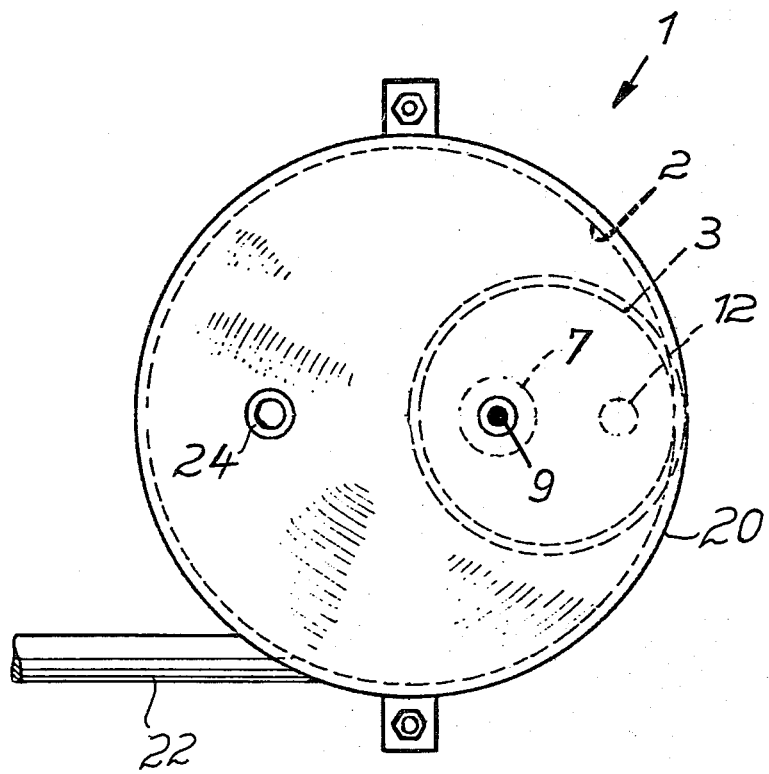
FIG. 2 is a top view of the devices shown in FIG. 1.

Referring now to the figures, FIGS. 1 and 2 illustrate a milk quantity meter 1 for milking stations, for directly measuring the quantity of milk yielded by a cow during a milking. A container 20 having a low-pressure separating chamber 2 is provided for separating the mixture from a mixture of milk and entrained air. The milk including the entrained air is directed through an inlet line 22 tangentially into the separating chamber 2. In the illustrated embodiment, air is separated from the mixture of milk and air as a result of the whirling motion imparted to the mixture as it flows into the chamber 2. The air is discharged from the chamber 2 by vent means 24 associated with the container 20. The separated milk is discharged into an adjacent milk measuring receptacle 3 by a downwardly extending outlet 28 attached to the bottom of the container. The milk measuring receptacle 3 is designed in the form of a closed-ended, right circular cylinder. The cylinder is provided, at its upper end surface, with an opening for receiving the outlet 28. The outlet 28 includes a milk inlet opening 7 which provides the fluid communication means for passing the separated milk from the container 28 to the receptacle 3. The cylinder is provided, at its lower end surface, with a milk outlet opening 8 concentrical with milk inlet opening 7. Both openings 7, 8 are alternately closed and opened by a common shutoff device 26. The shutoff device 26 includes an actuating rod 9 extending vertically through milk measuring receptacle 3 and separation chamber 2, and closing members 10, 11 carried thereon and associated with the two openings. One of the members 10 clears the milk inlet opening 7 while the other 11 opens the milk outlet opening 8, and conversely. Openings 7, 8 have circular cross sections. The closing members 10, 11 are designed as conical or, as shown, spherical shaped bodies for sealingly closing the openings 7, 8. Milk measuring receptacle 3 accommodates an electrical milk measuring device 5 for determining the milk quantity received in milk measuring receptacle 3. An electrically operated counter 6 is connected to milk measuring device 5. Milk measuring device 5 comprises a measuring tube 12 extending in milk measuring receptacle 3 coaxially with the axis thereof and equipped with magnet switches or contacts 13, for example reed-type contacts, which are arranged at predetermined axially spaced locations in the measuring tube 12 for sensing indicating the contents, and a magnetic float 14 which is slidably guided on measuring tube 12. As the float 14 rises in milk measuring receptacle 3 with the rising milk level, it actuates the magnet switches or contacts which are electrically connected to a counter 6. In an alternate embodiment (not illustrated) the measuring device comprises measuring electrodes which are arranged one above the other at definite spaced-apart locations indicating the contents and are electrically connected to the counter.

An externally disposed, removable sampling container 15 is provided between separation chamber 2 and milk measuring receptacle 3, which communicates, through corresponding flow lines 16, with separation chamber 2 and milk measuring receptacle 3.

While specific embodiments of the invention have been shown and described in detail to illustrate the application of the principles of the invention, it will be understood that the invention may be embodied otherwise without departing from such principles.

I claim:

1. In combination with a milk quantity meter for use in milking stations for directly measuring a quantity of milk for a quantity of milk and entrained air yielded by a cow during a milking of the type having a container for receiving milk and entrained air, means for directing milk and entrained air into said container and for separating said milk and air, air vent means associated with said container for the discharging of the air, a milk measuring receptacle adjacent to said container, connecting means providing fluid communication between said container and said receptacle such that the separated milk flows into said receptacle, the milk measuring receptacle having a closed cylinder vertically disposed below the separation chamber, said cylinder having a milk inlet opening at its upper end surface in fluid communication with said separation chamber and a milk outlet opening at its lower end surface concentrically of said milk inlet, shutoff means disposed within said receptacle alternately opening and closing both said milk inlet opening and said milk outlet opening, the improvement comprising sensing means for sensing the level of milk within the receptacle as an indication of the quantity thereof including a measuring tube extending coaxially with the receptacle axis within the receptacle, switch means arranged at predetermined axially spaced locations in said measuring tube for indicating the level of the milk, float slidably mounted on the measuring tube for actuating said switch means and an electrically operated counter operatively connected to said switch means for indicating the quantity of milk in response to the actuation of said switch means.

2. A milk quantity meter according to claim 1 further comprising a detachable sampling receptacle provided outside and between the container and the milk measuring receptacle, and detachably connected to the separation container and the milk measuring receptacle through corresponding flow lines.

3. A milk quantity meter according to claims 1 or 2 wherein said switch means includes magnetic switches.

4. A milk quantity meter according to claims 1 or 2 wherein said switch means includes measuring electrodes.

* * * * *